Nov. 18, 1930.  E. P. ARMSTRONG  1,781,941
SAW GRINDER
Filed May 28, 1927  2 Sheets-Sheet 1
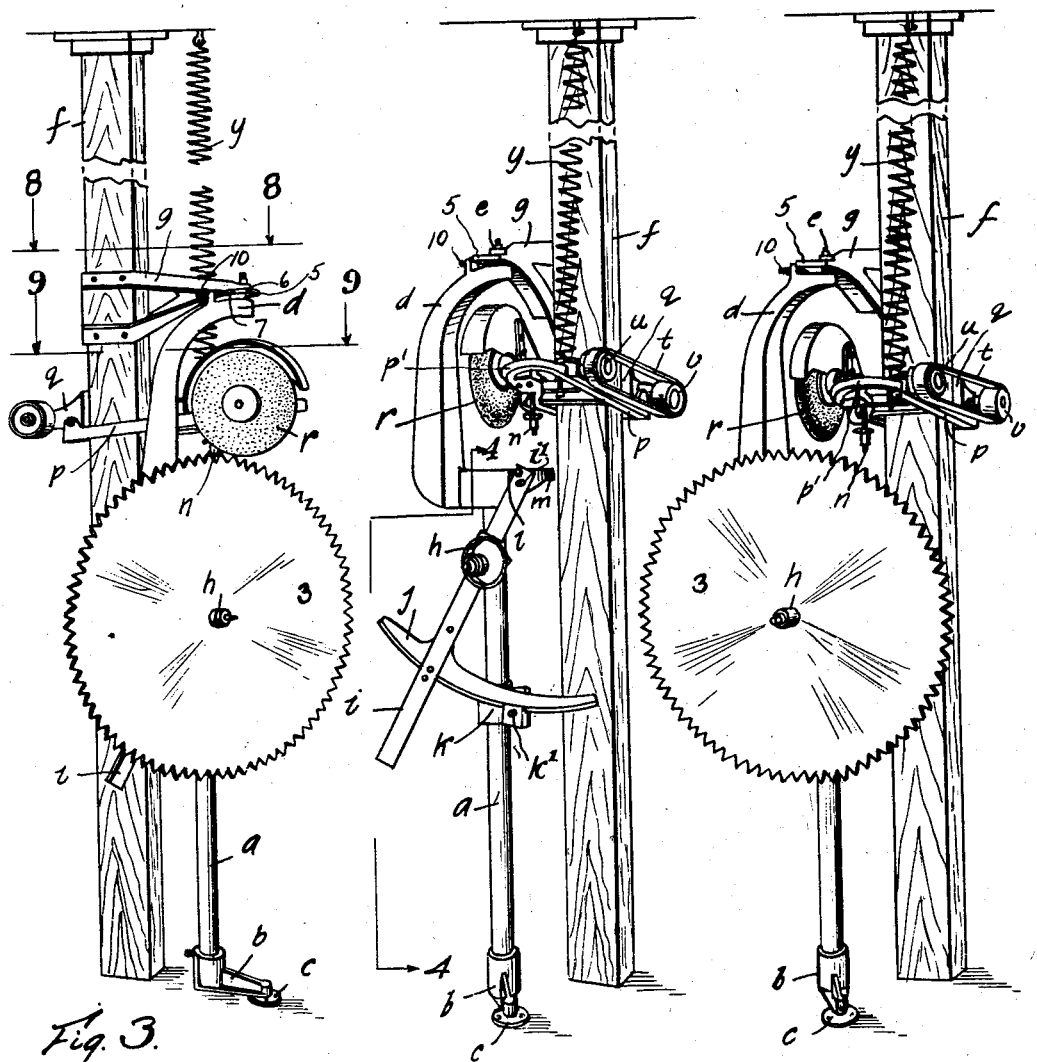
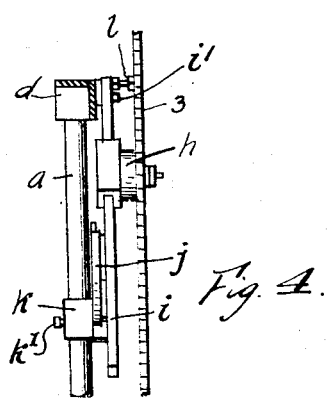
Inventor
Edward P. Armstrong
By
J. J. Geisler
Attorney Nov. 18, 1930.    E. P. ARMSTRONG    1,781,941
SAW GRINDER
Filed May 28, 1927    2 Sheets-Sheet 2

Inventor:
Edward P. Armstrong
By J. J. Geisler
Attorney

Patented Nov. 18, 1930

1,781,941

UNITED STATES PATENT OFFICE

EDWARD P. ARMSTRONG, OF PORTLAND, OREGON

SAW GRINDER

Application filed May 28, 1927. Serial No. 195,007.

My invention relates to saw grinders for circular saws of the type commonly used as trimmer saws, and the like.

A principal object of my invention is to provide an economical, circular saw grinder adapted for use in small saw mills, box factories, and the like, which may be located near the saw, and which is simple in construction and operation, but which will meet all the requirements for keeping the saws of this class sharp and properly ground.

Circular saws of this type are generally beveled on the opposite sides of alternate teeth, and the cutting face of the teeth are ground transversely of the saw to keep the edges of the teeth square and sharp.

Therefore, a grinder for saws of this type must be provided with at least three positive angular adjustments relatively to the saw tooth, that is, an angular adjustment for the bevel on each side of the saw tooth and an adjustment transverse of the saw, for grinding the cutting face of the teeth.

Another object of my invention is to provide a saw grinder adapted to center the grinding wheel on the saw, i. e., to set the grinding wheel so that it will grind the tooth at the correct angle with the center of the saw; and which will maintain such position during the other angular adjustment of the grinding wheel as well as when it is set to grind square.

A further object of my invention is to provide a saw grinder adapted to be used on saws of from seven to fifty-four inches in diameter, which feature is important, as cut off and trimmer saws of different diameters are used in all plants of this character.

I attain these and other incidental objects in a saw grinding device comprising a vertical member provided at its base with an arm, the other end of the arm adapted to rotate in a socket, and said member provided with an arcuate extension pivotally fastened to a post, in vertical alinement with said socket and provided with means for locking said vertical member in angular horizontal relation with a grinding head, and said member adapted to have a saw clamped thereon.

The grinding head being normally held out of operative engagement with the saw, and comprising a frame carrying a driven grinding wheel, adapted to be pivotally fixed to said post for movement in a vertical plane, whereby the saw clamped on said vertical member may be rotated about the axis of rotation of said member, and at the same time maintained in vertical alinement with the center of said grinding wheel.

The details of construction and the mode of operation of my invention will hereinafter be described in detail with reference to the accompanying drawings, in which:

Fig. 1 shows a perspective view of my saw grinder and illustrates the details of construction;

Fig. 2 shows a perspective view similar to Fig. 1, with a saw mounted in place, and illustrates the saw positioned to be ground transversely and the grinding head normally raised out of operative engagement with the saw;

Fig. 3 shows a view similar to Fig. 2 except the saw is positioned for having the beveled edges of the teeth ground;

Fig. 4 shows a section taken on the line 4—4 of Fig. 1, and illustrates certain details of construction;

Figure 8:
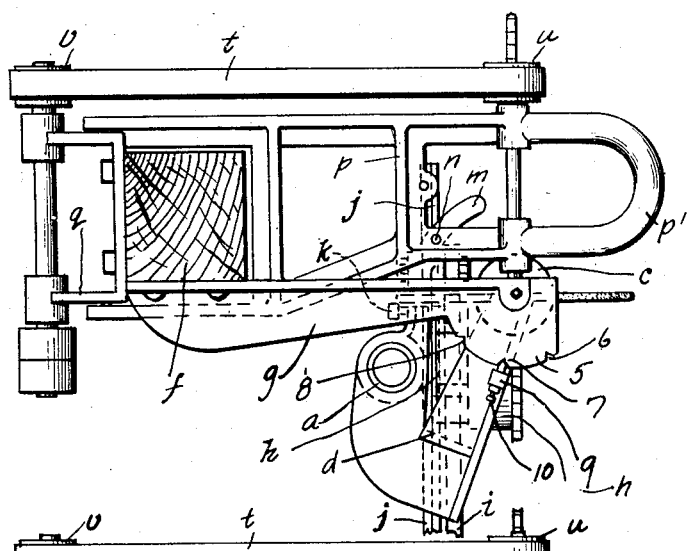
Fig. 8 shows a section taken on the line 8—8 of Fig. 3, and illustrates certain details of construction.
Figure 9:
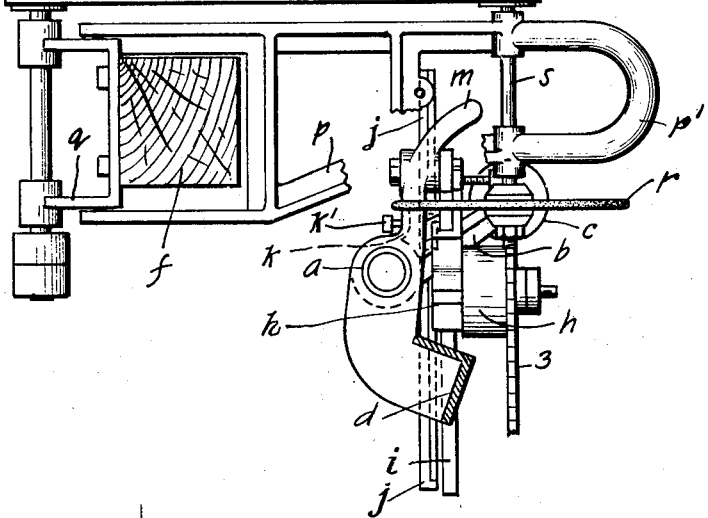
Fig. 9 shows a section taken on the line 9—9 of Fig. 3, and illustrates further details of construction.

My invention comprises a vertically arranged member $a$ or post mounted in an arm $b$, the other end of the arm being pivotally mounted on a plate $c$, fixed in the floor of the mill.

The upper end of the post $a$ is provided with an arcuate extension $d$, which is pivotally fixed as at $e$ in a bracket $g$ bolted to any convenient upright support $f$ of the mill.

The extension $d$ is so formed and the bracket $g$ is so arranged that the pivoted end $e$ is in exact vertical alinement with the socket $c$.

The bracket $g$ is provided with a circular segment 5 provided with notches 6, 7 and 8, and the upper end of the extension $d$ is provided with a lug 9, provided with a set screw 10 adapted to be set in any one of the three notches so that the post $a$ and the extension $d$ may be locked in any one of the three positions.

A pendent arm $i$, is pivoted to the extension $d$ and provided with an arcuate segment $j$ adapted to slide in a bracket $k$ fixed on the post $a$ by a set screw $k'$ and a saw carrying stud $h$, on which a clamping nut is threaded, is slidably mounted on the arm $i$.

An outstanding guide bar $l$ is provided on the upper end of the arm $i$, adjacent its pivoted end and serves as a guide against which the saw 3 will bear when the saw is clamped on the stud $h$.

A grinder head is provided comprising a frame $p$ pivotally fixed for vertical movement to a bracket $q$, the bracket $q$ adapted to be fixed on the same upright support $f$ as the bracket $g$, but below it, so that a grinding wheel $r$ mounted on a shaft $s$ which is journaled on the frame $p$ and driven by a belt $t$ mounted over pulleys $u$ and $v$, will coincide exactly with the vertical alinement of the two ends of the support $a$.

A downwardly extending rod $n$ is fixed on the frame $p$ which, when the grinder wheel is brought into operative engagement with the saw, will serve as a stop by striking against a curved finger $m$ provided on the lower end of the extension $d$.

A coil spring $y$ is fixed to the frame $p$ and to any convenient point above the said frame, whereby the grinding wheel will normally be held out of operative engagement with the saw.

The front portion of the frame $p$ is rounded and forms an operating handle $p'$ by which the operator may move the grinding wheel into operative engagement with the saw, against the action of the spring $y$.

The operation of my invention is as follows:

The arbor $h$ is adjusted correctly for the diameter of the saw to be ground, by sliding it on the arm $i$ until the distance from the periphery of the grinding wheel when in operative engagement is equal to the radius of the saw to be ground and then clamping the bracket $k$ on the post $a$ by the nut $k'$ by this construction the teeth will always be ground at the proper angle with the center of the saw.

Figure 5:
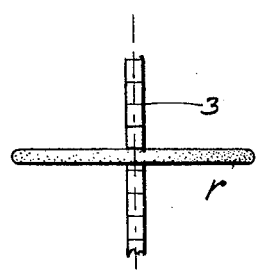
Figs. 5 and 6 and 7 show the three adjustments of the saw relatively to the grinding wheel.
Figure 6:
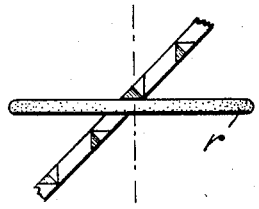
Figure 7:
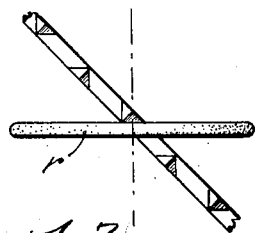

The saw 3 having been clamped on the arbor $h$, the post $a$ will be rotated about the grinder head, until the saw is brought into such angular relation to the grinding wheel, that a right beveled tooth, the square cutting face, or the left beveled tooth, may be ground as illustrated in Figs. 5, 6 and 7, showing the three positions.

If further adjustments for my saw grinder are desirable, it is only necessary to cut more notches in the circular segment 5 at such points as the additional adjustments are desired.

By constructing the post $a$ so that it may be revolved about a fixed point, and by arranging the grinder wheel so that it coincides with a vertical axis through said fixed point, when in operative engagement with the tooth of said saw, I provide a saw grinding device by which the various angles at which the saw teeth are to be ground may be adjusted by merely rotating the post $a$ on which the saw is clamped, about the grinding wheel and set for grinding a tooth which is beveled on its right side, then may be transversely ground on its face and finally setting the member $a$ so the next tooth which is beveled on its left side may be ground; all of which is done efficiently with one adjustment of the saw on the arbor $h$, with considerable saving in time.

I claim:

1. In combination with a saw-tooth grinder, a saw-blade support comprising, a supporting arm pivoted at one end to the floor, a post carried by the free end of said arm, an offset extension on said post to a point above the grinding wheel of the grinder, said extension having a lateral projection, a bracket to which the upper end of said extension is pivoted, the axes of the said two pivots coinciding, a pendent arm pivoted at its upper end to the said lateral projection, and means adjustable on said pendent arm for clamping the saw-blade thereon.

2. In combination with a saw-tooth grinder, a saw-blade support, comprising, a supporting arm pivoted at one end to the floor, a post carried by the free end of said arm, an offset extension on said post to a point above the grinding wheel of the grinder, said extension having a lateral projection, a bracket to which the upper end of said extension is pivoted, the axes of the said two pivots coinciding, a pendent arm pivoted at its upper end to the said lateral projection, an arcuate guide member carried by the lower end of said pendent arm, a guide element on said post with which said arcuate guide member cooperates, and means adjustable on said pendent arm for clamping the saw-blade thereon.

3. In combination with a saw-tooth grinder, a saw-blade support, comprising, a supporting arm pivoted at one end to the floor and provided with a socket at its other end, a post carried by the free end of said arm, an offset extension on said post to a point above the grinding wheel of the grinder, said extension having a lateral projection, a bracket to which the upper end of said extension is pivoted, the axes of the said two pivots coinciding, a pendent arm pivoted at its upper end to the said lateral projection, an arcuate guide member carried by the lower end of said pendent arm, a guide element on said post with which said arcuate guide member cooperates, means adjustable on said pendent arm for clamping the saw-blade thereon, and a stop provided on the upper end of said post for limiting the downward movement of said grinder wheel towards the saw-blade.

EDWARD P. ARMSTRONG.